(12) United States Patent
Merat

(10) Patent No.: US 11,692,596 B2
(45) Date of Patent: Jul. 4, 2023

(54) AXIALLY ORIENTED LINEAR ACTUATOR INCLUDING SINGLE STATOR COIL, AND CLUTCH ASSEMBLY HAVING THE ACTUATOR

(71) Applicant: Means Industries, Inc., Saginaw, MI (US)

(72) Inventor: Ali Merat, Fenton, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/480,512

(22) Filed: Sep. 21, 2021

(65) Prior Publication Data

US 2022/0099147 A1     Mar. 31, 2022

Related U.S. Application Data

(60) Provisional application No. 63/083,194, filed on Sep. 25, 2020.

(51) Int. Cl.
    *F16D 27/14*            (2006.01)
    *F16D 27/00*            (2006.01)

(52) U.S. Cl.
    CPC ........... *F16D 27/004* (2013.01); *F16D 27/14* (2013.01); *F16D 2027/008* (2013.01); *F16D 2200/0021* (2013.01)

(58) Field of Classification Search
    CPC ......... F16D 27/00–14; F16D 41/12–16; F16H 48/00–2048/426
See application file for complete search history.

(56) References Cited

U.S. PATENT DOCUMENTS

| | | | |
|---|---|---|---|
| 3,263,784 A | 8/1966 | Pierce | |
| 3,601,641 A | 8/1971 | Baermann | |
| 5,960,916 A | 10/1999 | Organek et al. | |
| 8,813,929 B2 | 8/2014 | Kimes | |
| 9,303,699 B2 | 4/2016 | Kimes et al. | |
| 9,377,061 B2 | 6/2016 | Kimes et al. | |
| 9,435,387 B2 | 9/2016 | Kimes et al. | |
| 9,541,143 B2 | 1/2017 | Kimes et al. | |
| 9,874,252 B2 | 1/2018 | Kimes et al. | |
| 10,590,999 B2 | 3/2020 | Kimes | |
| 10,619,681 B2 | 4/2020 | Kimes | |

(Continued)

OTHER PUBLICATIONS

United States Patent and Trademark Office, Mail Stop PCT, International Search Report for International Application No. PCT/US2021/52107 dated Jan. 11, 2022.

*Primary Examiner* — David R Morris
(74) *Attorney, Agent, or Firm* — Burgess Law Office, PLLC

(57) ABSTRACT

An axially oriented, two-position linear actuator includes a fixed stator having a single stator coil and a linear movable translator. The linear actuator is oriented axially in that the stator and the translator are axially offset from one another and the translator is axially movable between first and second end positions toward and away from the stator. For the translator to move between the end positions, the stator coil attracts or repels the translator depending on the polarity of the electrical current of the stator coil. The linear actuator may be part of a clutch assembly, such as a dynamically controllable clutch, for use in controlling coupling members of the clutch assembly.

19 Claims, 9 Drawing Sheets

(56) References Cited

U.S. PATENT DOCUMENTS

| | | |
|---|---|---|
| 11,035,423 B2 | 6/2021 | Kimes |
| 2002/0155913 A1* | 10/2002 | Fusegi .................... F16H 48/30 |
| | | 192/84.92 |
| 2003/0062789 A1* | 4/2003 | Stuart .................... H02K 15/03 |
| | | 310/156.48 |
| 2012/0145505 A1 | 6/2012 | Kimes |
| 2017/0248174 A1* | 8/2017 | Greene .................. F16D 27/09 |
| 2018/0274606 A1* | 9/2018 | Klaser .................... F16D 41/12 |
| 2018/0347642 A1 | 12/2018 | Kimes |
| 2021/0246950 A1 | 8/2021 | Pawley et al. |

\* cited by examiner

AXIALLY ORIENTED LINEAR ACTUATOR
INCLUDING SINGLE STATOR COIL, AND
CLUTCH ASSEMBLY HAVING THE
ACTUATOR

CROSS-REFERENCE TO RELATED APPLICATIONS

This application claims the benefit of U.S. Provisional Application No. 63/083,194, filed Sep. 25, 2020, the disclosure of which is hereby incorporated in its entirety by reference herein.

TECHNICAL FIELD

The present invention relates to automotive clutch assemblies and, more particularly, to a linear actuator for controlling and operating coupling members of such clutch assemblies.

BACKGROUND

A one-way clutch ("OWC") includes a first coupling (or clutch) member, a second coupling member, and at least one locking element (or locking member) between opposing surfaces of the coupling members. The locking element is movable between (i) a deployed (or engaged) position in which the locking element extends from the first coupling member and engages the second coupling member and (ii) a non-deployed (or disengaged) position in which the locking element does not extend from the first coupling member and does not engage the second coupling member. When the locking element is in the deployed position and engages the second coupling member, the OWC locks in one direction of rotation but has free rotation in the opposite direction. Two types of OWCs often used in vehicular, automatic transmissions include roller type clutches, which can include spring-loaded rollers between inner and outer races of the OWC, and sprag type clutches, which can include asymmetrically shaped wedges located between inner and outer races of the OWC.

A selectable OWC ("SOWC") (also known as a two-way clutch) further includes a second set of locking elements in combination with a selector plate to add multiple functions to the OWC. A SOWC can produce a mechanical connection between rotating or stationary input/output power flow components (e.g., input/output shafts respectively connected to the coupling members) in one or both directions and can overrun in one or both directions. A SOWC contains an externally controlled selection mechanism movable between positions for adjusting the selector plate to different corresponding operating modes of the SOWC.

Dynamic clutches are clutch assemblies in which the first and second coupling members are both rotatable. A Dynamic Controllable Clutch (or dynamic selectable clutch) ("DCC") packages in dynamic clutch positions where typically dog clutches, synchronizers, and wet friction packs would be located. Using electric actuation, the DCC eliminates the need for hydraulic systems and creates substantial packaging and system efficiency benefits. Particularly, as discussed herein, a DCC uses a type of actuation system involving a linear actuator which can control the locking elements while either or both coupling members are rotating.

Referring now to FIGS. 1A, 1B, 1C, 1D, and 1E (collectively "FIGS. 1"), a DCC 12 in accordance with the prior art will be described. DCC 12 is a component of a system (not shown), such as an automotive transmission, further having an input power flow component (e.g., a drive gear) and an output power flow component (e.g., a driven shaft).

DCC 12 has a radially inner rotating race, i.e., a first coupling member in the form of a pocket plate 13, and a radially outer rotating race, i.e., a second coupling member in the form of a notch plate 16. Pocket plate 13 is fixedly connected to a first power flow component of the system and notch plate 16 is fixedly connected to a second power flow component of the system. Consequently, the first and second power flow components are connected when pocket and notch plates 13 and 16, respectively, are connected.

Pocket plate 13 contains first and second sets of radial locking elements 26 for clockwise ("CW") and counterclockwise ("CCW") engagement, respectively. During engagement, at least one of locking elements 26 simultaneously contacts pocket and notch engagement faces of pocket and notch plates 13 and 16, respectively, which thereby connects the pocket and notch plates together. The connection of pocket and notch plates 13 and 16 together connects the first and second power flow components together. Consequently, in each locked direction of rotation, DCC 12 can transmit torque between the power flow components, which are connected together via the connected pocket and notch plates 13 and 16.

DCC 12 is electrically actuated by an actuation system in the form of a linear motor ("linear actuator") 14. Linear actuator 14 includes a stator 22 and a translator 20. Stator 22 is fixed in position such as being fixed to a transmission case (not shown) via mounts 47. Stator 22 includes a pair of copper wire induction coils 44 and 46. Steel plates 48, 50, and 52 provide a housing for stator coils 44 and 46. Stator coils 44 and 46 are wound in series with reversed polarity relative to one another (anti-series).

Translator 20 is linearly movable between lateral (i.e., axial) positions. Translator 20 is fixedly connected to and rotates with pocket plate 13. Translator 20 includes an annular ring of segmented permanent magnets 21, steel plates 23 and 25, and rigid plungers 30. Plungers 30 operate locking elements 26. Plungers 30 extend through holes formed through a carriage of translator 20 and are biased by apply springs 34. Plungers 30 are threaded at their ends and secured within their holes by internally threaded nuts 35. Conical ends of plungers 30 extend through apertures of a ring 55.

FIGS. 1B, 1C, 1D, and 1E detail how linear actuator 14 controls locking elements 26. Linear actuator 14 can control locking elements 26 while pocket plate 13 and notch plate 16 are rotating. Plungers 30 within translator 20 directly contact locking elements 26 and cause them to pitch up or pitch down depending on actuation direction. Linear actuator 14 has an "off" position (shown in FIGS. 1B and 1D) and an "on" position (shown in FIGS. 1C and 1E). Linear actuator 14 switches between the "off" and "on" positions by causing translator 20 to laterally move between, in this case, a right-most position (shown in FIGS. 1B and 1D) and a left-most position (shown in FIGS. 1C and 1E).

When translator 20 moves from "off" to "on", each plunger 30 contacts the under face or surface of its locking element 26 so the locking element can engage into notch plate 16. DCC 12 can transmit torque in each locked direction of rotation when locking elements 26 are engaged with notch plate 16. A return spring 28 under each locking element 26 is compressed during the engaged state. When commanded "off", translator 20 moves back toward the "off" position and plungers 30 lose contact with locking elements 26. Compressed return springs 28 create a force that causes locking elements 26 to pitch downward or disengage. Once a torque reversal occurs, locking elements 26 can disengage and DCC 12 can freewheel.

To change state from "off" to "on", electrical current energizes stator coil 46 nearest to translator 20. Energized induction coil 46 produces a magnetic field which repels the steady state field generated by permanent magnets 21 while far stator coil 44 produces an attractive magnetic field. The combination of repelling and attracting forces caused by stator coils 44 and 46 causes translator 20 to move.

Once translator 20 passes over center stator steel plate 50, permanent magnet 21 attempts to fully align leftmost stator steel plate 48. However, a mechanical stop 53 (FIGS. 1D and 1E) prevents full alignment, which results in a biasing force that holds translator 20 in the "on" position. Translator 20 is magnetically latched in the "on" position.

To disengage DCC 12, current is applied to stator coil 44 nearest to translator 20 (formerly far stator coil 46) and linear actuator 14 moves from the "on" stop 53 to a ring which functions as an "off" stop 42 in a similar manner described above. The "off" mechanical stop 42 prevents full alignment of permanent magnet 21 and rightmost stator steel plate 52, remaining magnetically latched in the "off" position.

As described, linear actuator 14 is a radially oriented, two-position linear actuator having a pair of stator coils 44 and 46. Linear actuator 14 is radially oriented in that stator 22 and translator 20 are radially offset from one another with stator 22 being the outer radial component and translator 20 being the inner radial component.

SUMMARY

An object of the present invention is an axially oriented linear actuator.

Another object of the present invention is an axially oriented linear actuator having a single stator coil.

A further object of the present invention is a linear actuator having a single stator coil.

Another object of the present invention is a clutch assembly having the axially oriented linear actuator for controlling and operating coupling members of the clutch assembly.

A further object of the present invention is a clutch assembly including the linear actuator having the single stator coil.

In carrying out at least one of the above and/or other objects, a linear actuator for use in controlling coupling members of a clutch assembly is provided. The linear actuator includes (i) a stator having a stator coil and (ii) a translator that is axially offset from the stator. The translator is movable, depending on polarity of electrical current of the stator coil, along an axial direction between a first position adjacent the stator and a second position away from the stator.

In embodiments, the stator coil is a single stator coil and the stator has no other stator coils.

After the translator has been moved into the first position adjacent the stator, the translator may magnetically latch in the first position adjacent the stator by a magnetic loop extending through a stator core of the stator and a permanent magnet of the translator. After the translator has been moved into the second position away from the stator coil, the translator may magnetically latch in the second position away from the stator by a magnetic loop extending through a stator latching plate of the stator and the permanent magnet of the translator.

The permanent magnet may include a plurality of segmented permanent magnets.

The stator may encapsulate the translator. The stator may further include (i) a stator core having the stator coil, (ii) a stator latching plate, and (iii) a stator connector connecting the stator core and the stator latching plate. The stator core and the stator latching plate may be ferromagnetic and the stator connector may be non-magnetic. In other embodiments, the stator does not include the stator connector and the stator core and the stator latching plate are directly connected to one another.

In embodiments, the stator and/or the translator has an annular form.

The translator may include radially outer and inner, ferromagnetic, translator rings and a permanent magnet radially extending therebetween.

Further, in carrying out at least one of the above and/or other objects, a clutch assembly is provided. The clutch assembly includes (i) first and second coupling members supported for rotation relative to one another about a rotational axis, (ii) a locking element, and (iii) a linear actuator having a stator and a translator that are oriented axially relative to one another. The translator is axially movable relative to the stator to a first position away from the stator to cause the locking element to move to a deployed position in which the locking element mechanically couples the coupling members together to prevent relative rotation of the coupling members in at least one direction about the rotational axis.

The translator is further axially movable relative to the stator to a second position adjacent the stator to cause the locking element to move to a non-deployed position in which the coupling members are not mechanically coupled together by the locking element whereby the coupling members may rotate relative to one another in the at least one direction about the rotational axis.

The first coupling member may be a pocket plate and the second coupling member may be a notch plate.

Also, in carrying out at least one of the above and/or other objects, a system is provided. The system includes the clutch assembly and first and second power flow components. The first power flow component may be a drive or input component and the second power flow component may be a driven or output component. The first and second power flow components are fixedly connected to the first and second coupling members, respectively, whereby torque flow between the power flow components via the coupling members is enabled when the locking element mechanically couples the coupling members together to prevent relative rotation of the coupling members in the at least one direction about the rotational axis.

The translator is further axially movable relative to the stator to a second position adjacent the stator to cause the locking element to move to a non-deployed position in which the coupling members are not mechanically coupled together by the locking element whereby the coupling members may rotate relative to one another in the at least one direction about the rotational axis and torque flow between the power flow components is disabled.

In accordance with embodiments of the present invention, the axially oriented linear actuator includes (i) a fixed stator having a single stator coil and (ii) a linear movable translator. The stator coil attracts or repels the translator depending on the polarity of the electrical current of the stator coil. The translator is thereby movable between first and second positions relative to the stator.

The prior art linear actuator 14 described herein also has a fixed stator and a linear movable translator. However, linear actuator 14 is oriented radially (i.e., the stator and the translator are oriented radially relative to one another). In contrast, the axially oriented linear actuator is oriented axially (i.e., the stator and the translator are oriented axially relative to one another). Further, linear actuator 14 has a pair of stator coils. In contrast, the axially oriented linear actuator may include just a single stator coil.

The axially oriented linear actuator is for use in a clutch assembly to control and operate coupling members of the clutch assembly. The axially oriented linear actuator is oriented axially in that the stator and the translator are axially offset from one another relative to the coupling members of the clutch assembly. The translator is axially movable between first and second end positions toward and away from the stator. The first and second end positions correspond to first and second operating modes of the clutch assembly.

The axially oriented linear actuator can be used for controlling or operating any clutch assembly which requires a two-position linear actuator such as dynamically controllable clutches including DCC 12 described herein.

In comparison with currently available linear actuators such as linear actuator 14, the axially oriented linear actuator in accordance with embodiments of the present invention can provide higher actuation forces and higher latching forces, can be designed for smaller packaging space both radially and axially, requires only one stator coil, and requires less copper material for the coil winding since it is composed of only one stator coil.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
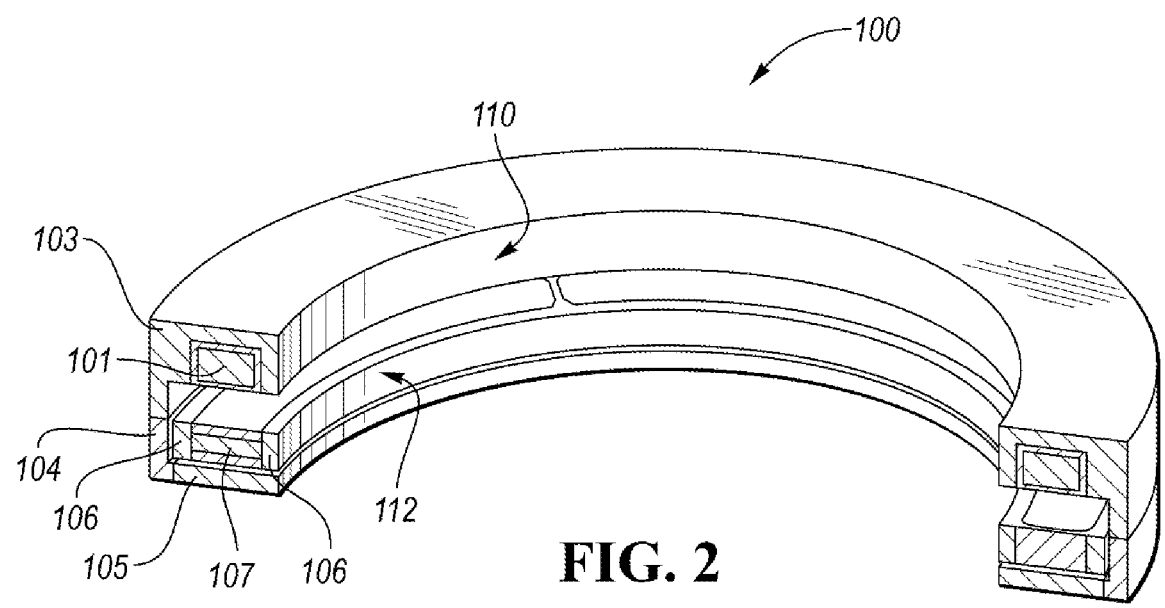
FIG. 2 illustrates a perspective view, partially broken away and in cross section, of an axially oriented linear actuator in accordance with embodiments of the present invention.
Figure 3:
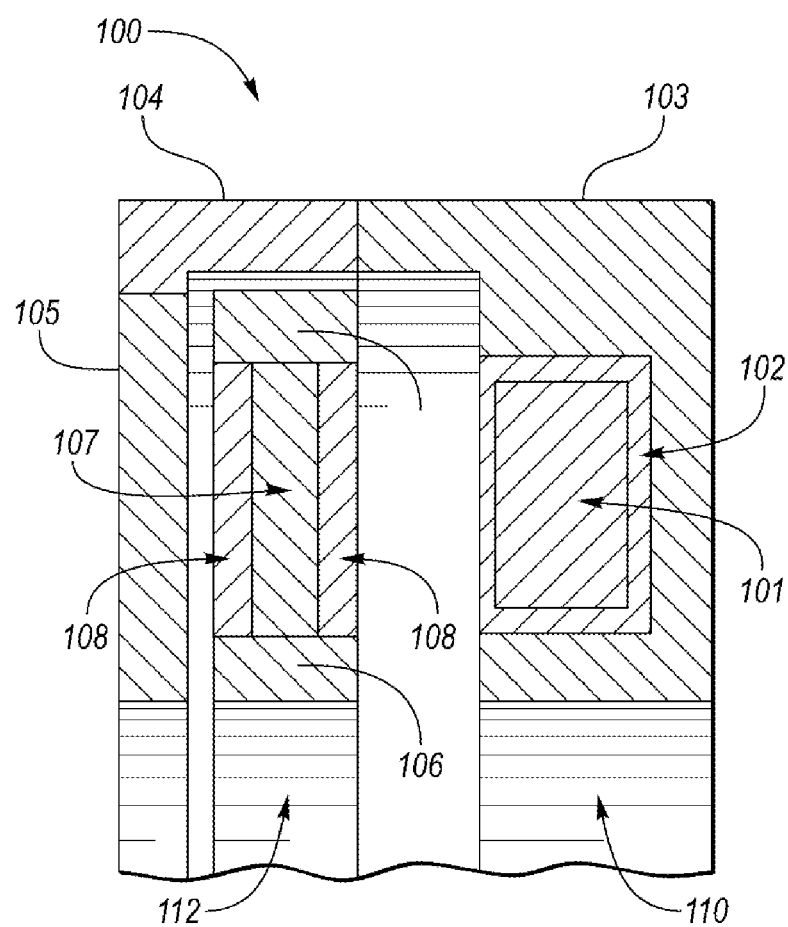
FIG. 3 illustrates a quarter model, cross-sectional view of the axially oriented linear actuator.

Referring now to FIGS. 2 and 3, a linear actuator 100 in accordance with embodiments of the present invention is shown. As will be described, in these embodiments, linear actuator 100 is an axially oriented, two-position electromagnetic linear actuator having a single stator coil. Linear actuator 100 can be used for controlling or operating the coupling members of any clutch assembly which requires a two-position linear actuator, such as DCC 12.

Linear actuator 100 has a fixed stator 110 and a linear movable translator 112. Stator 110 and translator 112 each have an annular form. Stator 110 and translator 112 are axially offset from one another along an axial direction. Translator 112 is at least partially encapsulated by stator 110 as best shown in FIG. 2. Translator 112 is linearly movable relative to stator 110 at least between a first position adjacent to the stator and a second position away from the stator.

Stator 110 includes an induction or stator coil 101, a stator coil encapsulation 102, a stator core 103, a stator connector 104, and a latching plate 105. In these embodiments, stator coil 101 is a single stator coil and stator 110 has no other stator coils. Stator coil 101 may be comprised of copper. Stator coil encapsulation 102 encapsulates stator coil 101 and may be an over-mold and/or may be comprised of epoxy. Stator core 103 is comprised of ferromagnetic material. Stator connector 104 may be non-magnetic or comprised of ferromagnetic material. Latching plate 105 is comprised of ferromagnetic material. Any of the ferromagnetic material may be ferromagnetic steel. In certain embodiments, stator core 103 and latching plate 105 are comprised of ferromagnetic steel.

Translator 112 includes radially outer and inner translator rings 106, segmented permanent magnets 107, and magnet encapsulation 108. Translator rings 106 are comprised of ferromagnetic material such as ferromagnetic steel. Magnet encapsulation 108 encapsulates permanent magnets 107 and is non-magnetic.

As illustrated in FIGS. 2 and 3 and as described, stator 110 is comprised of stator core 103, stator coil 101, stator coil encapsulation 102, stator connector 104, and latching plate 105. Stator connector 104 can be made of magnetic or non-magnetic material. The use of non-magnetic material (aluminum, stainless-steel, etc.) in this region improves performance of linear actuator 100, but to simplify the assembly process a magnetic material (steel) can also be used here if application allows for lower actuation forces. When both stator core 103 and stator connector 104 are made of the same material such as steel, stator connector 104 can be part of stator core 103 as one part.

As further illustrated in FIGS. 2 and 3 and as described, translator 112 is composed of translator rings 106, segmented permanent magnets 107, and non-magnetic material 108 to secure and fix the permanent magnets to the translator assembly. Translator 112 moves to either of two ends by magnetic attraction or repulsion forces when current flows through stator coil 101. This attraction or repulsion depends on the actuation current polarity. Once translator motion is completed to either end, translator 112 is secured in place by a magnetic latching force on either end.

Figure 4:
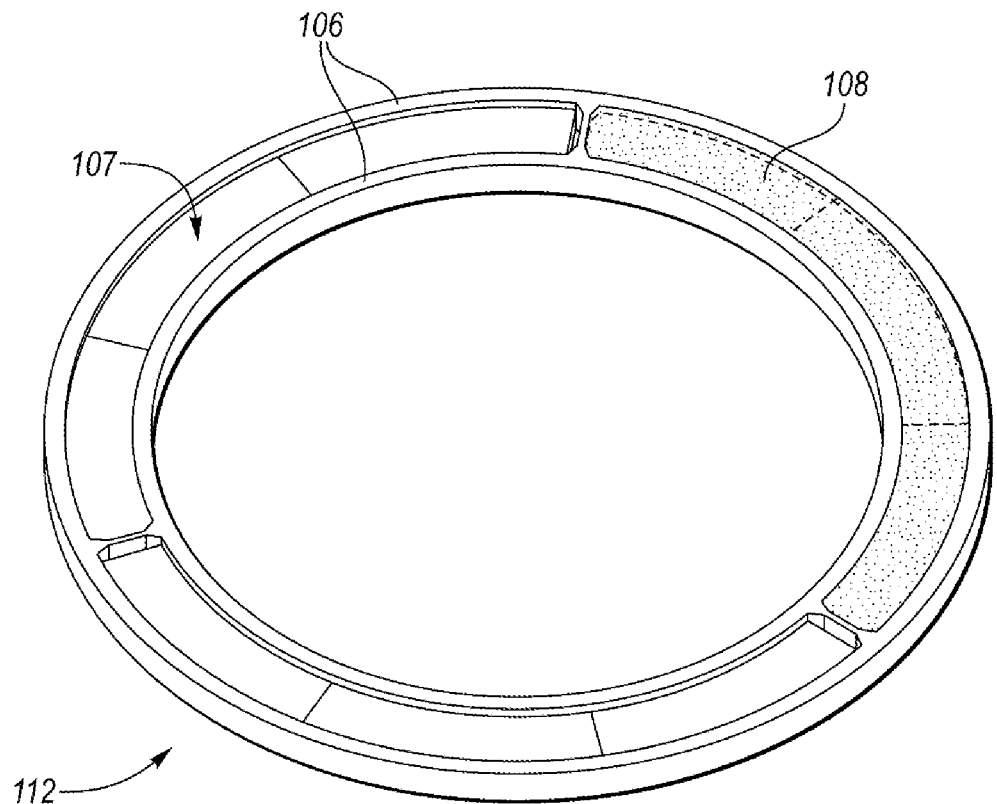
FIG. 4 illustrates a perspective view of the translator of the axially oriented linear actuator.
Figure 5:
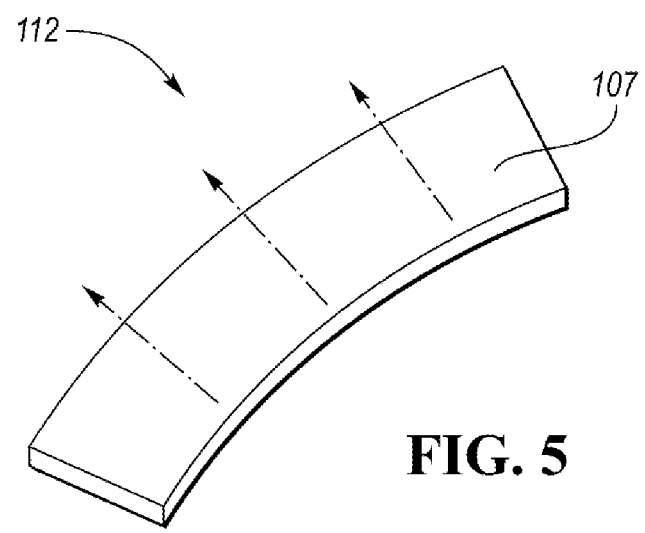
FIG. 5 illustrates a sectional view depicting the magnetization of segmented permanent magnets of the translator.

Referring now to FIGS. 4 and 5, with continual reference to FIGS. 2 and 3, translator 112 will be described in further detail. FIG. 4 illustrates a perspective view of translator 112. Therein, it is best shown that translator 112 has the form of an annular ring. As further shown in FIG. 4, translator 112 is comprised of translator rings 106 which are connected to each other as one-part, segmented permanent magnets 107 (nine segments are shown in FIG. 4), and non-magnetic encapsulation material 108 (only one of the three transparent segments are shown in FIG. 4 so the corresponding permanent magnets 107 can be seen). Permanent magnets 107 are held in place by any non-magnetic material capable of securing the permanent magnets in place (over-mold, epoxy, aluminum, stainless steel, etc.).

FIG. 5 illustrates a sectional view depicting the magnetization of permanent magnets 107. As indicated therein, permanent magnets 107 are magnetized radially outwards as shown by the arrows. Of course, permanent magnets 107 could alternatively be magnetized radially inwards. In this alternative case, the attraction and repulsion actions will be opposite from what is described herein for the case of permanent magnets 107 being magnetized radially outwards.

Translator 112 is linearly movable between the first position to be adjacent stator 110 and the second position to be away from stator 110 depending on the polarity of electrical current of stator coil 101. More particularly, translator 112 is laterally movable, along an axial direction relative to coupling members of a clutch assembly (not shown) to which linear actuator 100 operates, between an "off" position of linear actuator 100 and an "on" position of linear actuator 100. For instance, for linear actuator 100 operating pocket plate 13 and notch plate 16 of DCC 12, the DCC is in a free wheel mode when linear actuator 100 is in the "off" position and the DCC is in a lock mode when linear actuator 100 is in the "on" position.

Figure 6A:
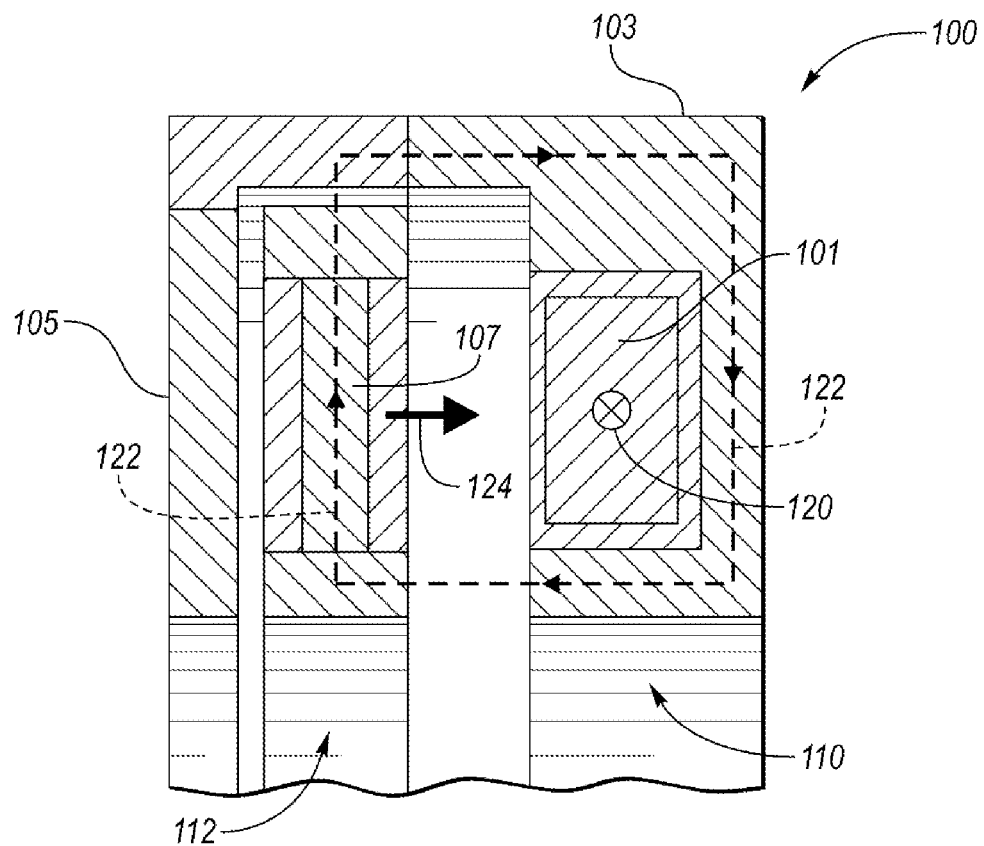
FIG. 6A illustrates a schematic cross-sectional view of the axially oriented linear actuator in which the translator is being controlled to laterally move from left-to-right (i.e., the inventive linear actuator switching from the "on" position to the "off" position) (herein, the left-most position is considered to be the "on" position and the right-most position is considered to be the "off" position; of course, depending on functions, required forces, and structure of the clutch assembly, the roles could be reversed with the left-most position being the "off" position and the right-most position being the "on" position)
Figure 6B:
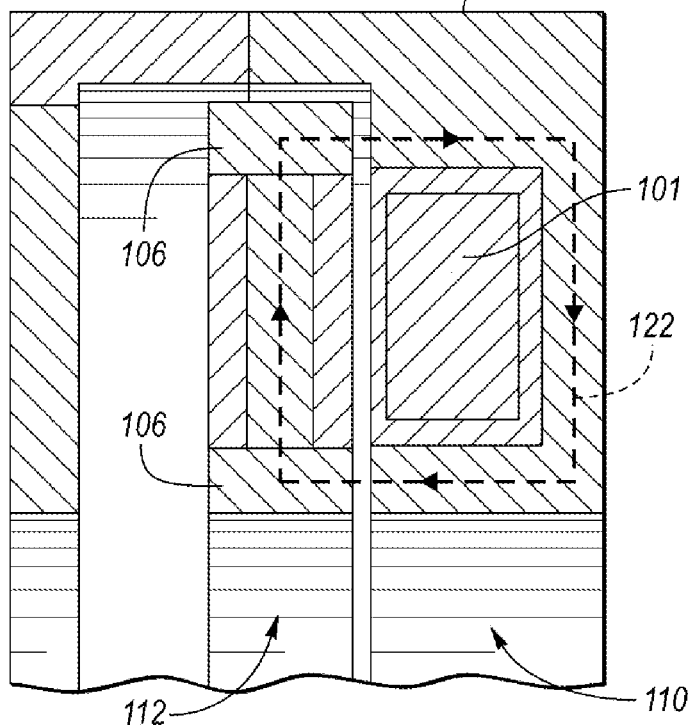
FIG. 6B illustrates a schematic cross-sectional view of the axially oriented linear actuator in which the translator is in the right-most position and is magnetically latched (i.e., the linear actuator is magnetically latched in the "off" position)

Referring now to FIGS. 6A and 6B, the operation of linear actuator 100 switching from the "on" position to the "off" position will be described. In FIG. 6A, translator 112 is being controlled to laterally move from left to right. The actuation events include electrical current flowing through single stator coil 101 (into the page in FIG. 6A as indicated by symbol 120). A magnetic loop 122 is generated in the direction of the magnetization of permanent magnets 107. Magnetic loop 122 attracts translator 112 towards stator coil 101. Consequently, translator 112 moves from left to right toward stator coil 101 as indicated by arrow 124.

Once the motion from left to right is complete, translator 112 is in the right end position adjacent to stator coil 101 as shown in FIG. 6B. The actuation current is turned off and translator 112 is latched in the right end position and held in place by the force generated by magnetic loop 122. As such, linear actuator 100 is magnetically latched in the "off" position.

Figure 7A:
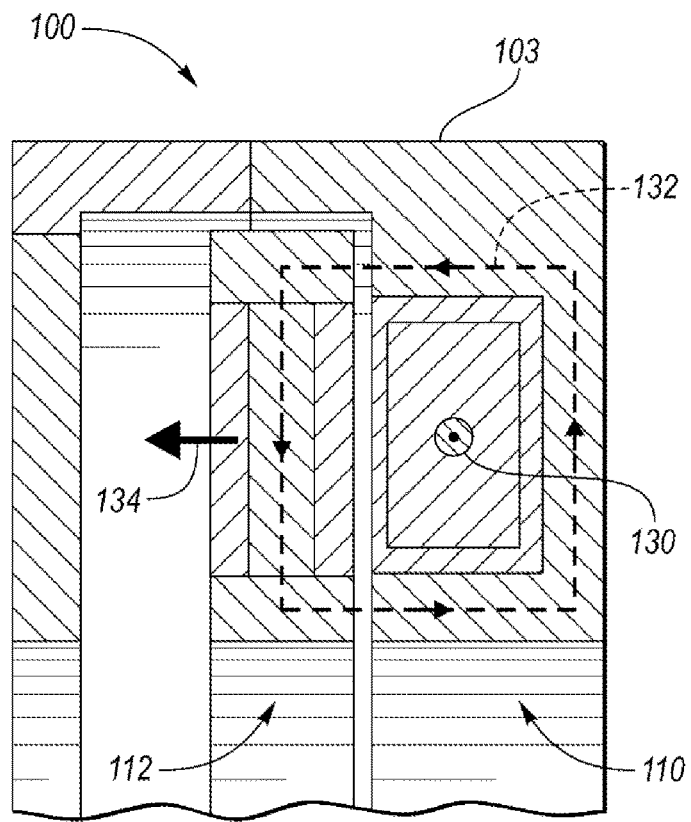
FIG. 7A illustrates a schematic cross-sectional view of the axially oriented linear actuator in which the translator is being controlled to laterally move from right to left (i.e., the linear actuator switching from the "off" position to the "on" position)
Figure 7B:
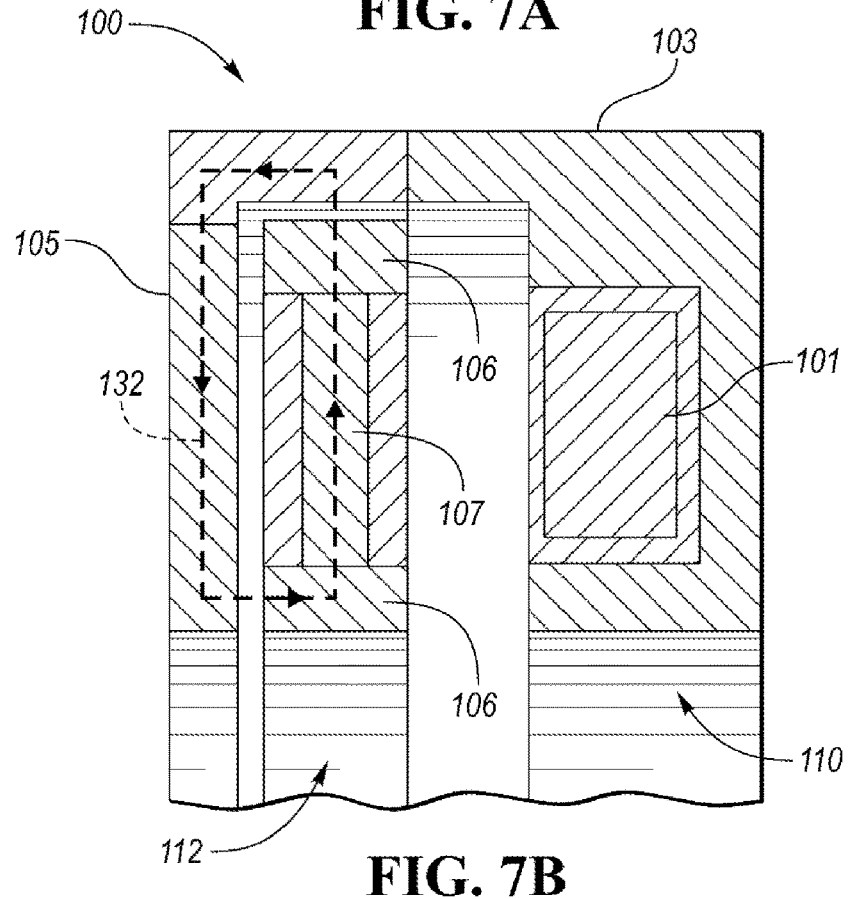
FIG. 7B illustrates a schematic cross-sectional view of the axially oriented linear actuator in which the translator is in the left-most position and is magnetically latched (i.e., the linear actuator is magnetically latched in the "on" position)

Referring now to FIGS. 7A and 7B, the operation of linear actuator 100 switching from the "off" position to the "on" position will be described. In FIG. 7A, translator 112 is being controlled to laterally move from right to left. The actuation events include electrical current flowing through single stator coil 101 (out of the page in FIG. 7A as indicated by symbol 130). A magnetic loop 132 is generated opposite the direction of the magnetization of permanent magnets 107. Magnetic loop 132 repels translator 112 away from stator coil 101. Consequently, translator 112 moves from right to left away from stator coil 101 as indicated by arrow 134.

Once the motion from right to left is complete, translator 112 is in the left end position adjacent to stator latching plate 105 as shown in FIG. 7B. The actuation current is turned off and translator 112 is latched in the left end position and held in place by the force generated by magnetic loop 132. As such, linear actuator 100 is magnetically latched in the "on" position.

Figure 8:
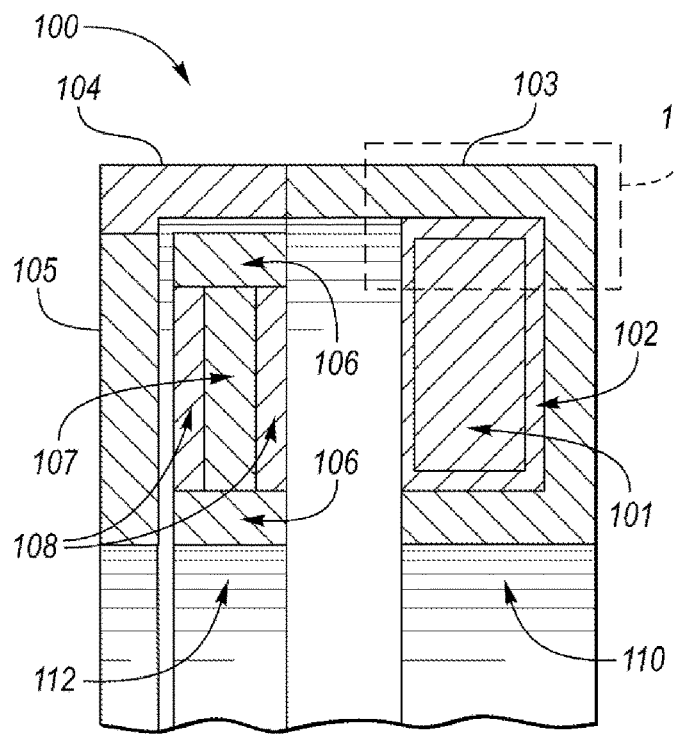
FIG. 8 illustrates a quarter model, cross-sectional view depicting an alternative stator core design/modification of the axially oriented linear actuator.

Referring now to FIG. 8, an alternative stator core design/modification of linear actuator 100. The stator core can be modified by reducing one of the magnetic poles resulting the geometry modification as shown in FIG. 8 in the area circled by circle line 140. This modification changes the performance of linear actuator 100 resulting in lower actuation forces but simplifies the manufacturing process. Therefore, it can be considered for applications where lower forces are allowed.

Figure 10:
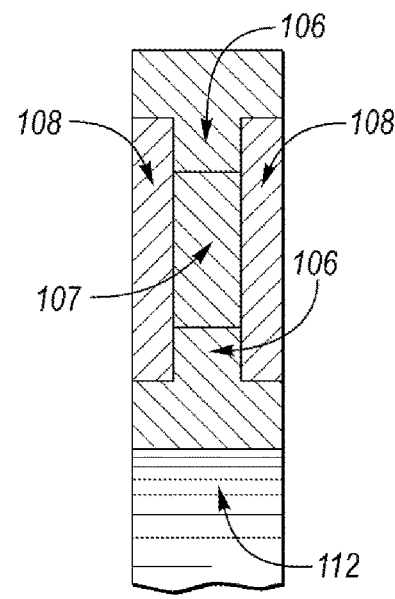
FIG. 10 illustrates a cross-sectional view of the translator of the axially oriented linear actuator shown in FIG. 9.
Figure 9:
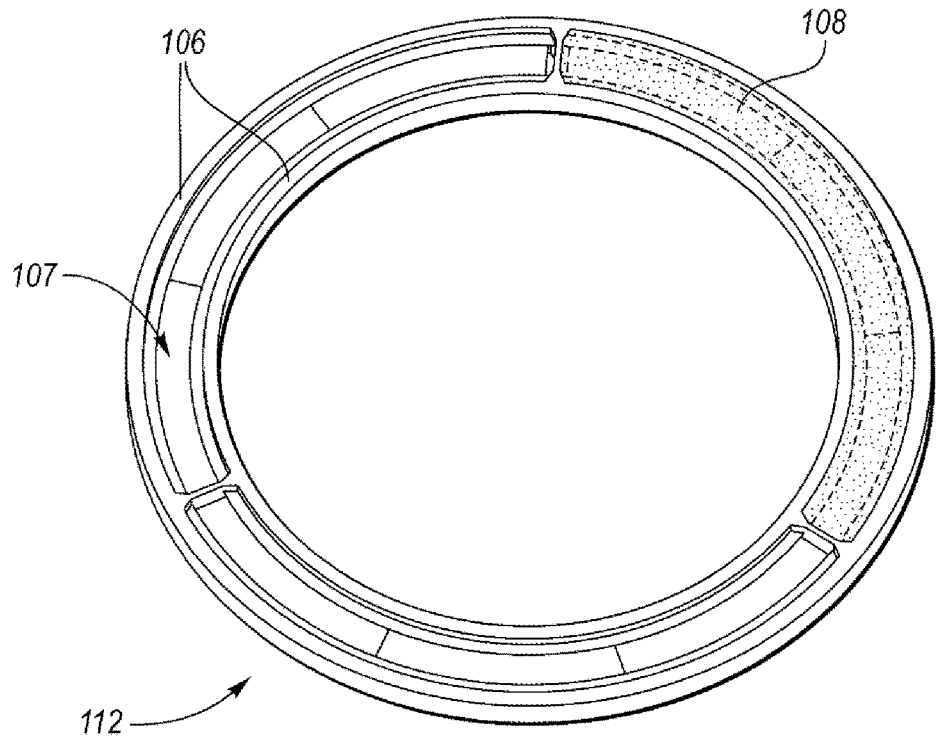
FIG. 9 illustrates a perspective view of the translator of the axially oriented linear actuator pursuant to another embodiment of the present invention.

Referring now to FIGS. 9 and 10, translator 112 according to an alternative design is shown. This alternative design of translator 112 can help reduce the permanent magnet material therefore reducing the overall cost. Reducing brittle permanent magnet material and implementing the changes to translator rings 106, as shown in FIG. 10, can increase the translator assembly structural integrity and make the assembly less sensitive to stresses due to centrifugal forces at high angular velocities.

The changes in this alternative design include reducing the size of permanent magnet segments 107 radially to thereby reduce the permanent magnet materials and implementing the changes to translator rings 106 as shown in FIG. 10. In sum, basically replacing some of the permanent magnet materials with steel as shown.

In other embodiments, the coil and magnet arrangements described herein are reversed with the stator and the translator. That is, the coil arrangement, described herein as being arranged as part of the stator, is instead arranged as part of the translator; and the magnet arrangement, described herein as being arranged as part of the translator, is instead arranged as part of the stator.

Linear actuator 100 may be a part of a clutch assembly having first and second coupling members (e.g., pocket plate and notch plate) supported for rotation relative to one another in first and second directions about a rotational axis. Linear actuator 100 is a part of the clutch assembly for controlling the coupling members. Particularly, translator 112 is axially movable relative to stator 110 to a first position away from the stator to cause a locking element of the clutch assembly to move to a deployed position in which the locking element mechanically couples the coupling members together to prevent relative rotation of the coupling members in at least one direction about the rotational axis. Conversely, translator 112 is axially movable relative to stator 110 to a second position adjacent the stator to cause the locking element to move to a non-deployed position in which the coupling members are not mechanically coupled together by the locking element whereby the coupling members may rotate relative to one another in the first and second directions about the rotational axis.

The clutch assembly may be a part of a system further having first and second power flow components fixedly connected to the first and second coupling members, respectively. In this case, torque flow between the power flow components via the coupling members is enabled when the locking element mechanically couples the coupling members together to prevent relative rotation of the coupling members in at least one direction about the rotational axis.

Figure 1A:
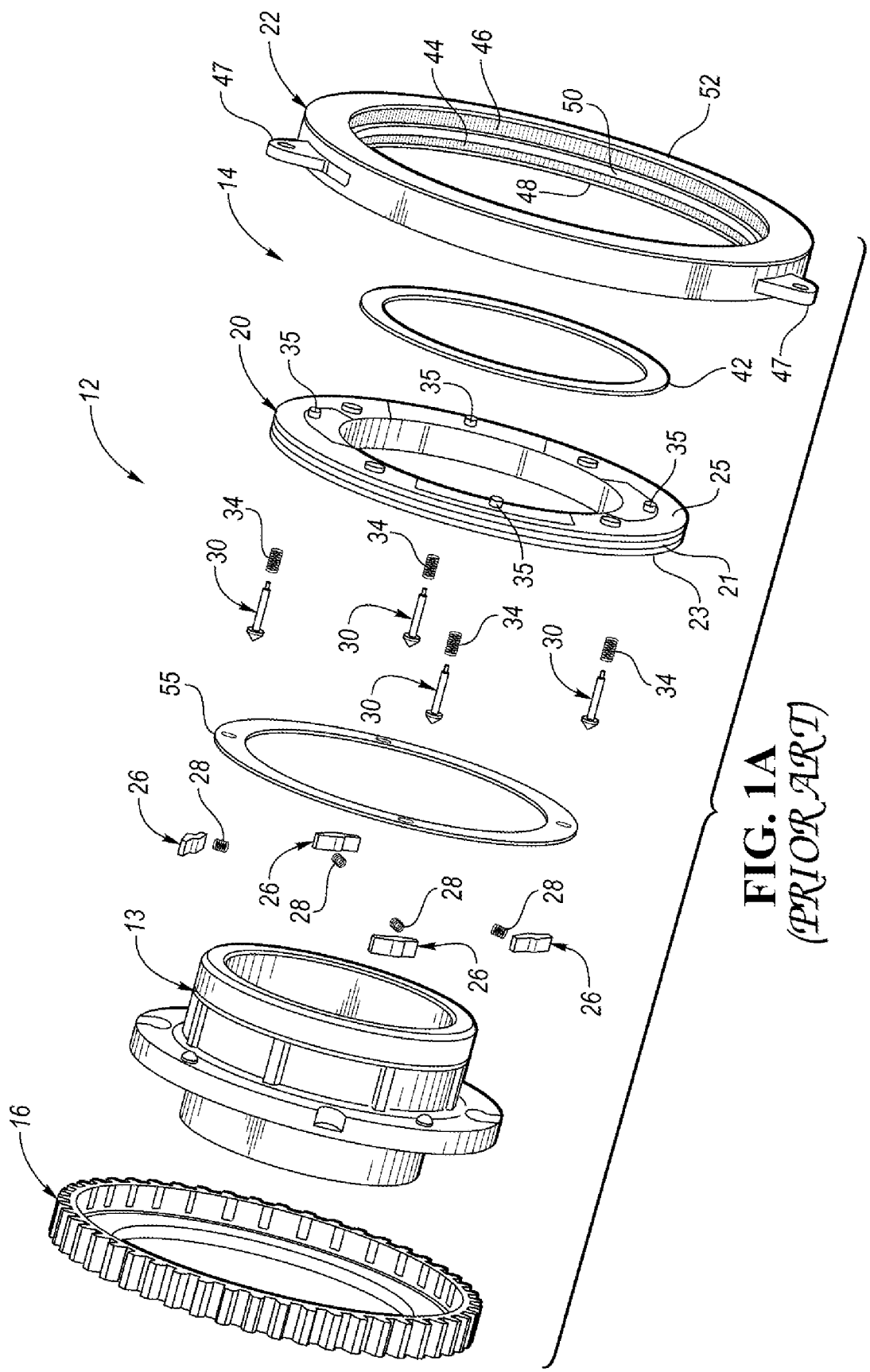
FIG. 1A is an exploded view of a dynamic controllable clutch ("DCC") in accordance with the prior art.
Figure 1B:
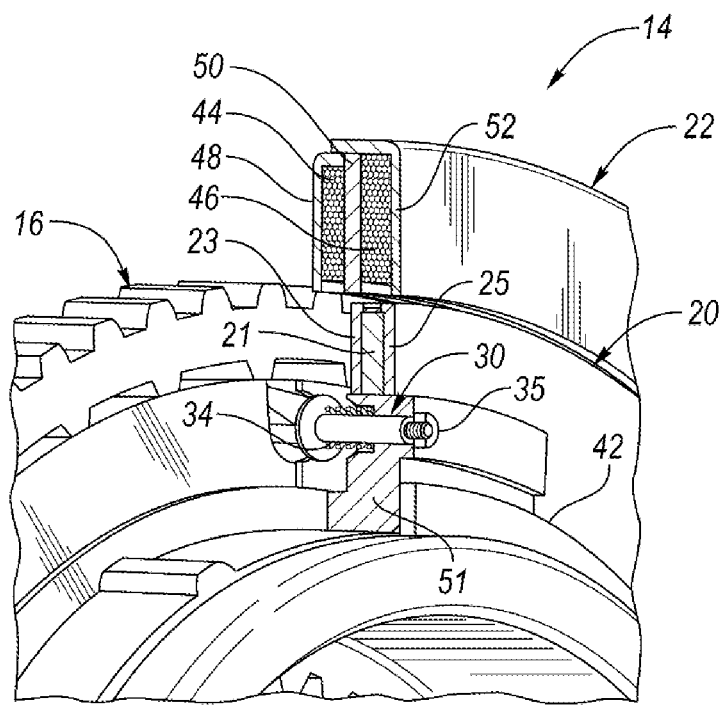
FIG. 1B is a perspective view, partially broken away and in cross section, of the DCC with a linear actuator of the DCC being in an "off" position whereby the DCC is in a free wheel mode.
Figure 1C:
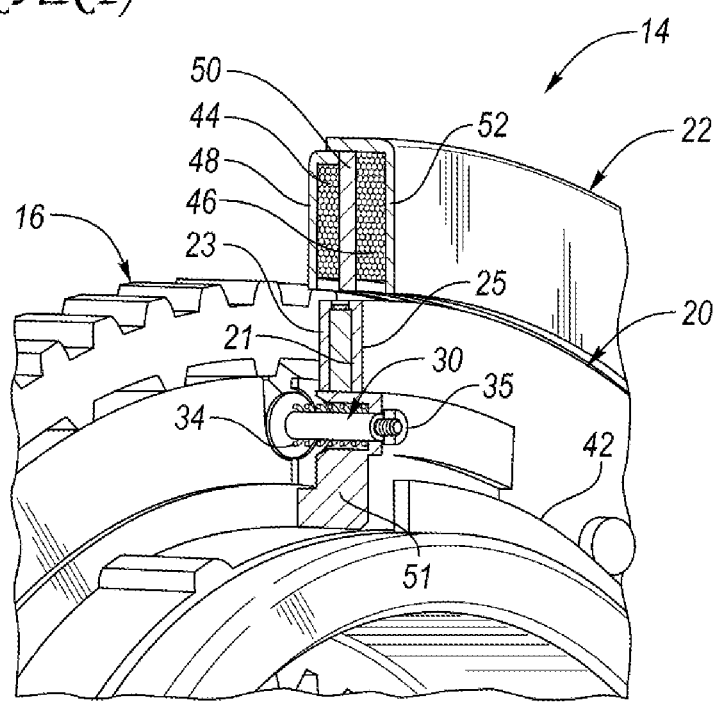
FIG. 1C is a perspective view, partially broken away and in cross section, of the DCC with the linear actuator being in an "on" position whereby the DCC is in a lock mode.
Figure 1D:
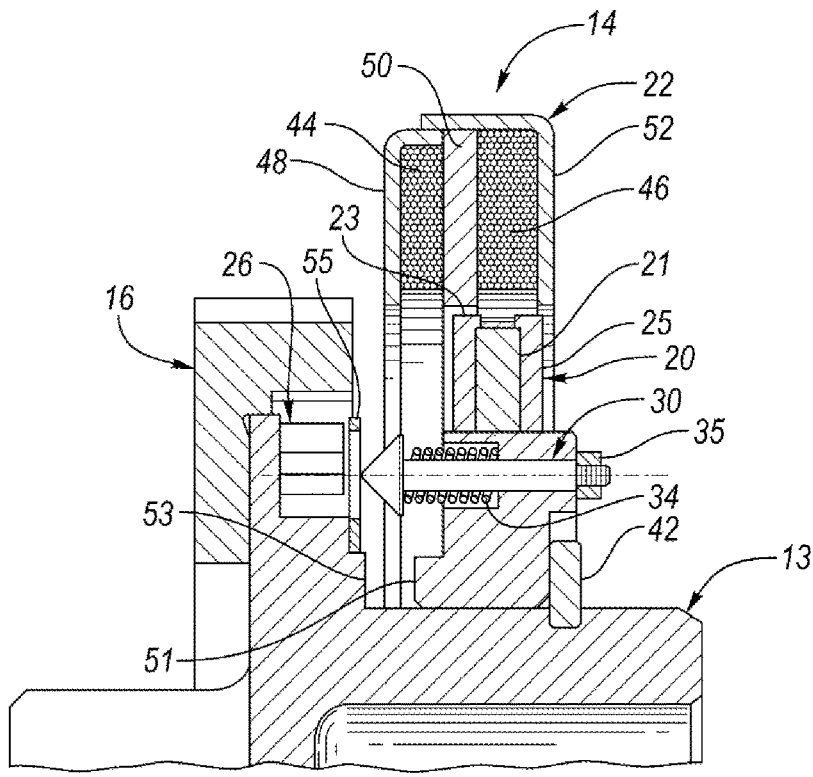
FIG. 1D is a side view, partially broken away and in cross section, of the DCC with a translator of the linear actuator being magnetically latched in the "off" position, wherein FIGS. 1B and 1D pertain to the same condition of the DCC.
Figure 1E:
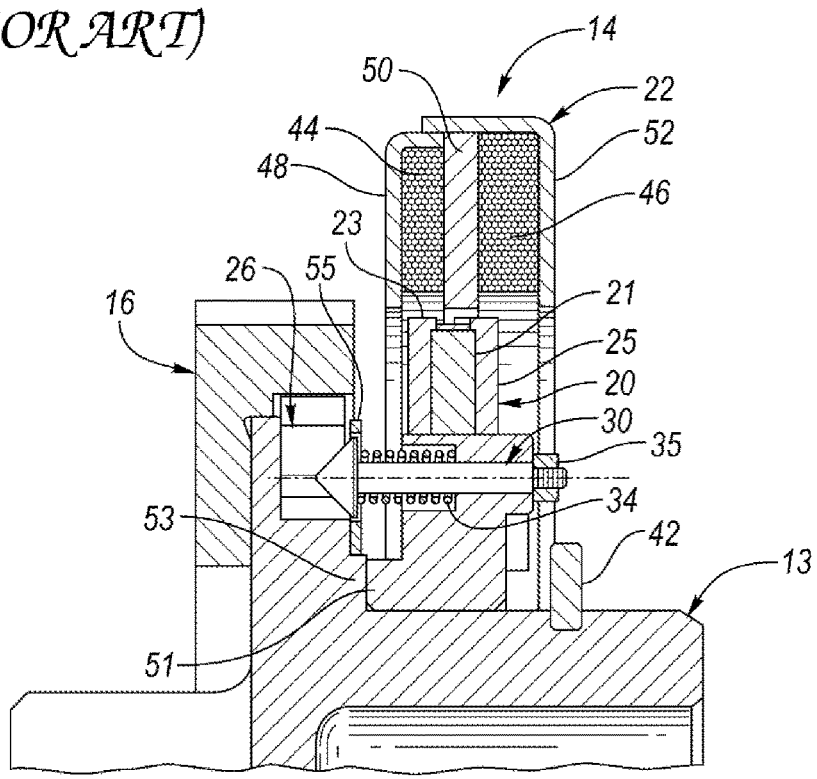
FIG. 1E is a side view, partially broken away and in cross section, of the DCC with the translator of the linear actuator being magnetically latched in the "on" position, wherein FIGS. 1C and 1E pertain to the same condition of the DCC.
Figure 11:
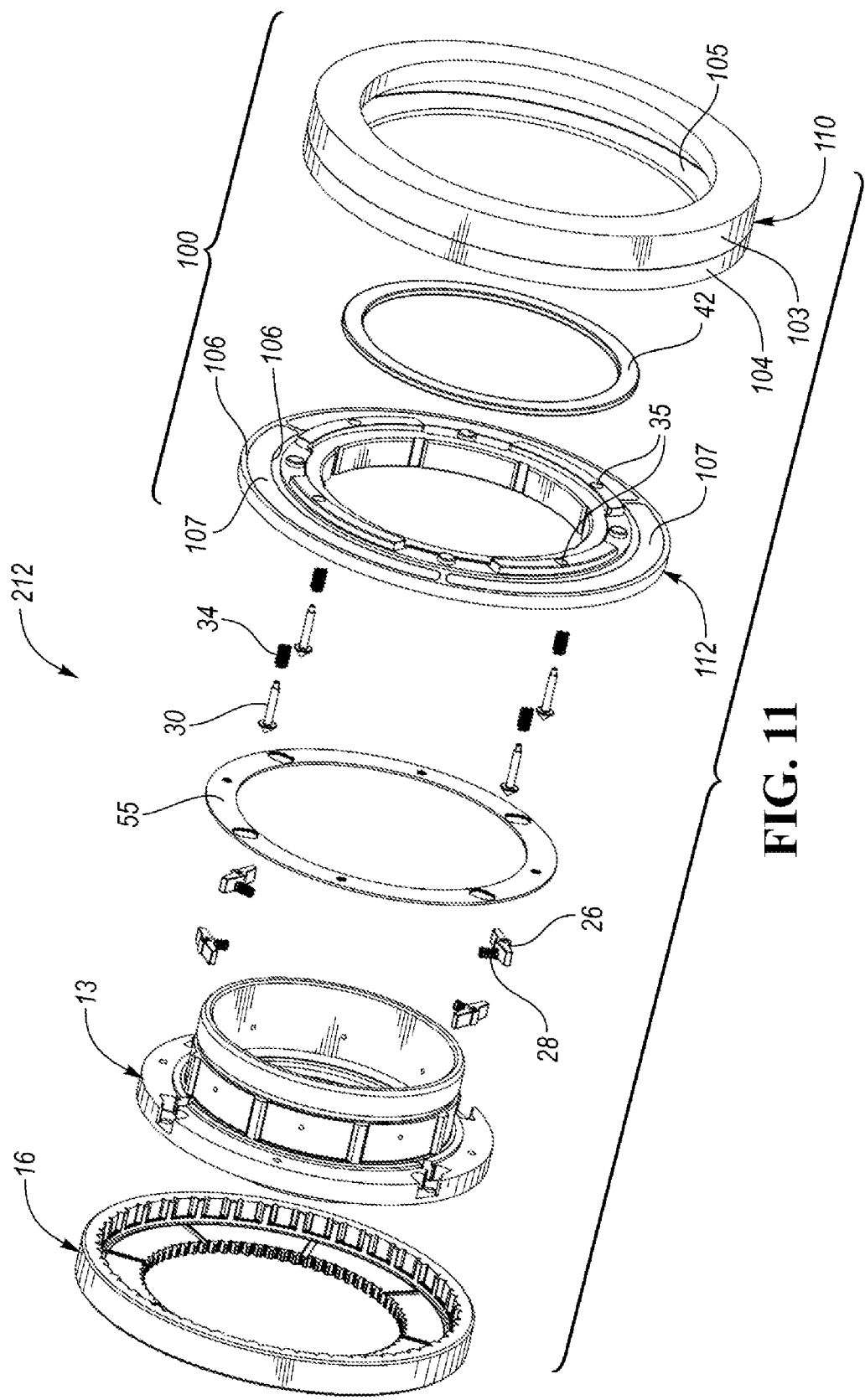
FIG. 11 illustrates an exploded view of a DCC in accordance with an embodiment of the present invention.

Referring now to FIG. 11, with continual reference to FIGS. 1A and 2, an exploded view of a DCC 212 in accordance with an embodiment of the present invention is shown. DCC 212 differs from DCC 12 shown in FIG. 1 in that DCC 212 includes linear actuator 100 in place of prior art linear actuator 14. DCC 212 otherwise has the same components of DCC 12, and these components are designated in FIG. 11 with the same reference numerals set forth in FIG. 1A.

Translator 112 of linear actuator 100 is fixedly connected to and rotates with pocket plate 13. Particularly, translator 112 is fixedly connected by the inner diameter of translator rings 106 to an outer circumferential surface of pocket plate 13. As described, translator 112 is linearly movable between axial "on" and "off" positions relative to pocket plate 13. Translator 112 being in the "on" position causes plungers 30 to contact the under face or surface of their locking elements 26 causing the locking elements to engage into notch plate 16. Translator 112 being in the "off" position causes plungers 30 to lose contact with their locking elements 26 thereby enabling the locking elements to disengage from notch plate 16.

DCC 212 is an example of a clutch assembly in which linear actuator 100 may be used for controlling or operating the coupling members of the clutch assembly. As indicated, linear actuator 100 can be used for controlling or operating the coupling members of any type of clutch assembly that requires a two-position linear actuator. Further, the connection of translator 112 of linear actuator 100 to pocket plate 13 from the inner diameter of translator 112 is an example of how translator 112 may be connected to clutch assembly components. Of course, as understood by those of ordinary skill in the art, there are many ways in which translator 112 can be connected to clutch assembly components.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A linear actuator for use in controlling coupling members of a clutch assembly, comprising:
   a stator having a stator coil and a stator core;
   a translator having a direction of motion;
   the stator coil generating a first magnetic loop;
   the translator being movable, depending on polarity of electrical current of the stator coil, along an axial direction between a position adjacent the stator and a position away from the stator wherein the first magnetic loop generated by the stator coil extends between the stator and the translator in a direction substantially parallel to the direction of motion;
   the translator includes a permanent magnet; and
   the translator magnetically latches in the position adjacent the stator by a second magnetic loop extending through the stator core and the permanent magnet.

2. The linear actuator of claim 1 wherein:
   the stator coil is a single stator coil and the stator has no other stator coils.

3. The linear actuator of claim 1 wherein:
   the stator further includes a stator latching plate; and
   after the translator has been moved into the position away from the stator, the translator magnetically latches in the position away from the stator by a third magnetic loop extending through the stator latching plate and the permanent magnet.

4. The linear actuator of claim 1 wherein:
   the permanent magnet includes a plurality of segmented permanent magnets.

5. The linear actuator of claim 1 wherein:
   the stator encapsulates the translator.

6. The linear actuator of claim 1 wherein:
   the stator further includes a connector connecting the stator core and a stator latching plate.

7. The linear actuator of claim 6 wherein:
   the stator core and the stator latching plate are both ferromagnetic.

8. The linear actuator of claim 1 wherein:
   the stator has an annular form; and
   the translator has an annular form.

9. A linear actuator for use in controlling coupling members of a clutch assembly, comprising:
   a stator having a stator coil;
   a translator axially offset from the stator;
   the translator being movable, depending on polarity of electrical current of the stator coil, along an axial direction between a first position adjacent the stator and a second position away from the stator;
   the stator further includes (i) a stator core having the stator coil, (ii) a stator latching plate, and (iii) a stator connector connecting the stator core and the stator latching plate; and
   the stator core and the stator latching plate are both ferromagnetic and the stator connector is non-magnetic.

10. A linear actuator for use in controlling coupling members of a clutch assembly, comprising:
    a stator having a stator coil;
    a translator axially offset from the stator;

the translator being movable, depending on polarity of electrical current of the stator coil, along an axial direction between a first position adjacent the stator and a second position away from the stator; and the translator includes radially outer and inner, ferromagnetic, translator rings and a permanent magnet radially extending therebetween.

11. A clutch assembly comprising:

first and second coupling members supported for rotation relative to one another about a rotational axis;

a locking element;

a linear actuator having a stator, a latching plate, and a translator that are oriented axially, in a direction of the rotational axis, relative to one another, the translator axially movable in the direction of the rotational axis between a position adjacent the stator and a position adjacent the latching plate;

a stator coil generating a first magnetic loop, the first magnetic loop extending between the stator and the translator in a direction substantially parallel to the direction of the rotational axis;

the translator includes a permanent magnet;

the translator magnetically latches in the position adjacent the latching plate by a second magnetic loop extending through the latching plate and the permanent magnet; and the linear actuator causes the locking element to move to a deployed position in which the locking element mechanically couples the first and second coupling members together to prevent relative rotation of the first and second coupling members in at least one direction about the rotational axis.

12. The clutch assembly of claim 11 wherein:

the linear actuator causes the locking element to move to a non-deployed position in which the first and second coupling members are not mechanically coupled together by the locking element whereby the first and second coupling members may rotate relative to one another in the at least one direction about the rotational axis.

13. The clutch assembly of claim 12 wherein:

the stator and the translator each have an annular form.

14. The clutch assembly of claim 12 wherein:

the first coupling member is a pocket plate and the second coupling member is a notch plate.

15. The clutch assembly of claim 11 wherein:

the stator has a single stator coil and no other stator coils; and the translator is axially movable in the direction of the rotational axis between the stator and the latching plate depending on polarity of electrical current of the stator coil.

16. A system comprising:

a clutch assembly including (i) first and second coupling members supported for rotation relative to one another about a rotational axis, (ii) a locking element, and (iii) a linear actuator having a stator and a translator that are oriented axially relative to one another, the translator being axially movable relative to the stator in the direction of the rotational axis to a position adjacent the stator and a position away from the stator;

a stator coil generating a first magnetic loop, the first magnetic loop extending between the stator and the translator in a direction substantially parallel to the direction of the rotational axis;

a stator core;

the translator includes a permanent magnet; and the translator magnetically latches in the position adjacent the stator by a second magnetic loop extending through the stator core and the permanent magnet;

a stator latching plate; and the translator magnetically latches in the position away from the stator by a third magnetic loop extending through the stator latching plate and the permanent magnet; and the linear actuator causes the locking element to move to a deployed position in which the first and second coupling members are mechanically coupled together by the locking element and a non-deployed position in which the first and second coupling members are not mechanically coupled together by the locking element; and first and second power flow components fixedly connected to the first and second coupling members, respectively, whereby torque flow between the first and second power flow components via the first and second coupling members is enabled when the locking element mechanically couples the coupling members together to prevent relative rotation of the coupling members in the at least one direction about the rotational axis and torque flow between the first and second power flow components via the first and second coupling members is disabled when the locking element moves to a non-deployed position in which the first and second coupling members are not mechanically coupled together by the locking element whereby the coupling members may rotate relative to one another in the at least one direction about the rotational axis.

17. The system of claim 16 wherein:

the stator has a single stator coil and no other stator coils; and the translator is axially movable relative to the stator depending on polarity of electrical current of the single stator coil.

18. The system of claim 16 wherein:

the first coupling member is a pocket plate and the second coupling member is a notch plate.

19. The linear actuator of claim 16 wherein:

an axial space in the direction of motion of the translator between the translator and the stator in the position away from the stator is greater than an axial space between the translator and the stator in the position adjacent the stator.

* * * * *